(12) United States Patent
Kamimae (10) Patent No.: US 8,870,256 B2
(45) Date of Patent: Oct. 28, 2014

(54) WORK VEHICLE CAB EQUIPPED WITH UTILITY BASE

(75) Inventor: Takeshi Kamimae, Kanazawa (JP)

(73) Assignee: Komatsu Ltd., Tokyo (JP)

( * ) Notice: Subject to any disclaimer, the term of this patent is extended or adjusted under 35 U.S.C. 154(b) by 13 days.

(21) Appl. No.: 13/703,816

(22) PCT Filed: Jun. 25, 2012

(86) PCT No.: PCT/JP2012/066136
§ 371 (c)(1),
(2), (4) Date: Dec. 12, 2012

(87) PCT Pub. No.: WO2013/088763
PCT Pub. Date: Jun. 20, 2013

(65) Prior Publication Data
US 2013/0154309 A1    Jun. 20, 2013

(30) Foreign Application Priority Data

Dec. 16, 2011    (JP) .................................. 2011-276471

(51) Int. Cl.
*B60N 3/10* (2006.01)
*B62D 33/06* (2006.01)
*E02F 9/16* (2006.01)
*E02F 9/08* (2006.01)
*B60R 7/04* (2006.01)

(52) U.S. Cl.
CPC .............. *E02F 9/16* (2013.01); *B62D 33/0612* (2013.01); *B60N 3/101* (2013.01); *E02F 9/163* (2013.01); *E02F 9/0833* (2013.01); *E02F 9/0858* (2013.01); *B60R 7/04* (2013.01)
USPC .................................. 296/24.44; 296/190.08

(58) Field of Classification Search
CPC .......... B60N 3/001; B60N 3/107; B60R 7/04; B60R 7/08; E02F 9/16
USPC .............. 296/24.44, 37.1, 37.8, 37.14, 37.15, 296/190.01, 190.08, 190.09
See application file for complete search history.

(56) References Cited

U.S. PATENT DOCUMENTS

| | | | |
|---|---|---|---|
| 6,554,351 B1 * | 4/2003 | El-Zein ..................... | 296/190.08 |
| 6,854,780 B2 * | 2/2005 | Siebert ........................ | 296/37.8 |
| 7,243,982 B2 * | 7/2007 | Kelley et al. .............. | 296/190.08 |
| 7,559,601 B2 * | 7/2009 | Ishii et al. ................ | 296/190.08 |
| 7,900,996 B2 * | 3/2011 | Kimura et al. ........... | 296/190.09 |
| 2008/0061577 A1 * | 3/2008 | Downey ..................... | 296/37.14 |
| 2010/0072782 A1 * | 3/2010 | Modzik et al. ............ | 296/190.09 |

FOREIGN PATENT DOCUMENTS

| | | |
|---|---|---|
| JP | 2003-226196 A | 8/2003 |
| JP | 2006-335201 A | 12/2006 |
| JP | 2010-229739 A | 10/2010 |

\* cited by examiner

*Primary Examiner* — Jason S Morrow
*Assistant Examiner* — E Turner Hicks
(74) *Attorney, Agent, or Firm* — Global IP Counselors, LLP (57) ABSTRACT

A cab includes a side panel, an operator seat, a rear panel and a utility base. The utility base includes: a base main body having a placement surface; and a front wall formed along a front side of the placement surface. The base main body has a cut-out portion formed in a front side corner thereof adjacent to an entrance in a plan view of the placement surface. The front wall has a stepped portion formed along the cut-out portion in a side view of the base main body.

7 Claims, 8 Drawing Sheets

WORK VEHICLE CAB EQUIPPED WITH UTILITY BASE

CROSS-REFERENCE TO RELATED APPLICATIONS

This application claims priority to Japanese Patent Application No. 2011-276471 filed on Dec. 16, 2011, the disclosure of which is hereby incorporated herein by reference in its entirety.

TECHNICAL FIELD

The present invention relates to a work vehicle cab equipped with a utility base for disposing thereon a lunch box and etc.

BACKGROUND ART

It has been conventionally known that a utility base is disposed between a cab entrance and an operator seat in work vehicles such as Wheel loaders (see e.g., Japan Laid-open Patent Application Publication No. JP-A-2006-335201). Such utility base is useful for disposing thereon a lunch box, a tool box and etc.

SUMMARY

However, when the entire length of the utility base is elongated in the back-and-forth direction for enhancing usability, the front end portion of the utility base is inevitably exposed from the entrance. Therefore, an operator should watch out not to stumble over the front end portion of the utility base with one's toe in getting on or off. Thus, a drawback is produced that operator's getting-on/off performance is degraded.

The present invention has been produced in view of the aforementioned situation, and an object thereof is to (provide a work vehicle cab equipped with a utility base whereby operator's getting-on/off performance can be enhanced.

A cab for a work vehicle according to a first aspect of the present invention includes, a side panel in which an entrance is formed; an operator seat including a pedestal part and a seat part disposed on the pedestal part; a rear panel disposed behind the operator seat; and a utility base that is disposed in front of the rear panel and between the operator seat and the side panel while being exposed through the entrance in a side view of the side panel. The utility base includes: a base main body having a placement surface; and a front wall formed along a front side of the placement surface. The base main body has a cut-out portion formed in a front side corner thereof adjacent to the entrance in a plan view of the placement surface. The front wall has a stepped portion formed along the cut-out portion in a side view of the base main body.

According to the cab for a work vehicle of the first aspect of the present invention, the front side corner of the utility base is cut out. Therefore, a space can be reliably produced for allowing an operator to move one's toe even when the utility base is disposed while being exposed through the entrance. Therefore, operator's getting-on/off performance can be enhanced. Further, the stepped portion is funned along the cut-out portion. Therefore, it is possible to place an installation object (e.g., a lunch box) having a size equivalent to that of a conventional one by making the corner portion of the installation object protrude from the stepped portion even when the installation space is reduced due to the cut-out.

A cab according to a second aspect of the present invention relates to the first aspect, and wherein the utility base is disposed rearwards of a first straight line connecting a front side corner portion of the pedestal part and a rear end of the entrance in a plan view.

According to the cab of the second aspect of the present invention, the utility base can be inhibited from entering a region that an operator moves one's toe. Therefore, operator's getting-on/off performance can be further enhanced.

A cab according to a third aspect of the present invention relates to the first or second aspect, and further includes a pillar disposed upright along a rear end of the entrance. The utility base is disposed rearwards of a second straight line connecting a front side corner portion of the pedestal part and the pillar in a plan view.

According to the cab of the third aspect of the present invention, the utility base can be inhibited from entering the region that an operator moves one's toe. Therefore, operator's getting-on/off performance can be further enhanced.

A cab according to a fourth aspect of the present invention relates to any of the first to third aspects, and further includes a pillar disposed upright along a rear end of the entrance. The utility base is disposed rearwards of a third straight line slanted about the pillar at an angle of 45 degrees with respect to a back-and-forth direction in a plan view.

According to the cab of the fourth aspect of the present invention, the utility base can be inhibited from entering the region that an operator moves one's toe. Therefore, operator's getting-on/off performance can be further enhanced.

A cab according to a fifth aspect of the present invention relates to any of the first to fourth aspects, and Wherein the base main body includes an accommodation recess formed on the placement surface.

According to the cab of the fifth aspect of the present invention, a small article can be accommodated under an installation object disposed on the placement surface. Therefore, the utility base can be enhanced in its convenience.

A cab according to a sixth aspect of the present invention relates to any of the first to fifth aspects, and wherein an upper end of the utility base is positioned lower than a seat surface of the seat part.

According to the cab of the sixth aspect of the present invention, an installation object can be inhibited from making contact with operator's arm and etc., when being placed on the utility base.

A cab according to a seventh aspect of the present invention relates to any of the first to sixth aspects, and includes a floor board on which the operator seat is disposed. A height of the base main body is equal to or higher than 30 mm from the floor board.

According to the cab of the seventh aspect of the present invention, an installation object can be disposed in a position higher than the position through which an operator's toe passes. Therefore, operator's getting-on/off performance can be enhanced.

According to the present invention, it is possible to provide a utility base whereby operator's getting-on/off performance can be enhanced and a cab equipped with the same.

DESCRIPTION OF THE EMBODIMENTS

Next, an exemplary embodiment of the present invention will be explained using figures. In the following description of the figures, the same or similar reference numeral is given to the same or similar elements. It should be noted that the figures are schematic only and respective dimensional ratios and etc. of the figures may be different from actual ones. Therefore, specific dimensions and etc. should be judged in view of the following explanation. Further, it is apparent that dimensional relations and ratios of corresponding parts/portions/sections are different among the figures.

In the following embodiment, a case will be exemplified that a utility base is installed in a wheel loader.

Overall Structure of Wheel Loader 1

Figure 1:
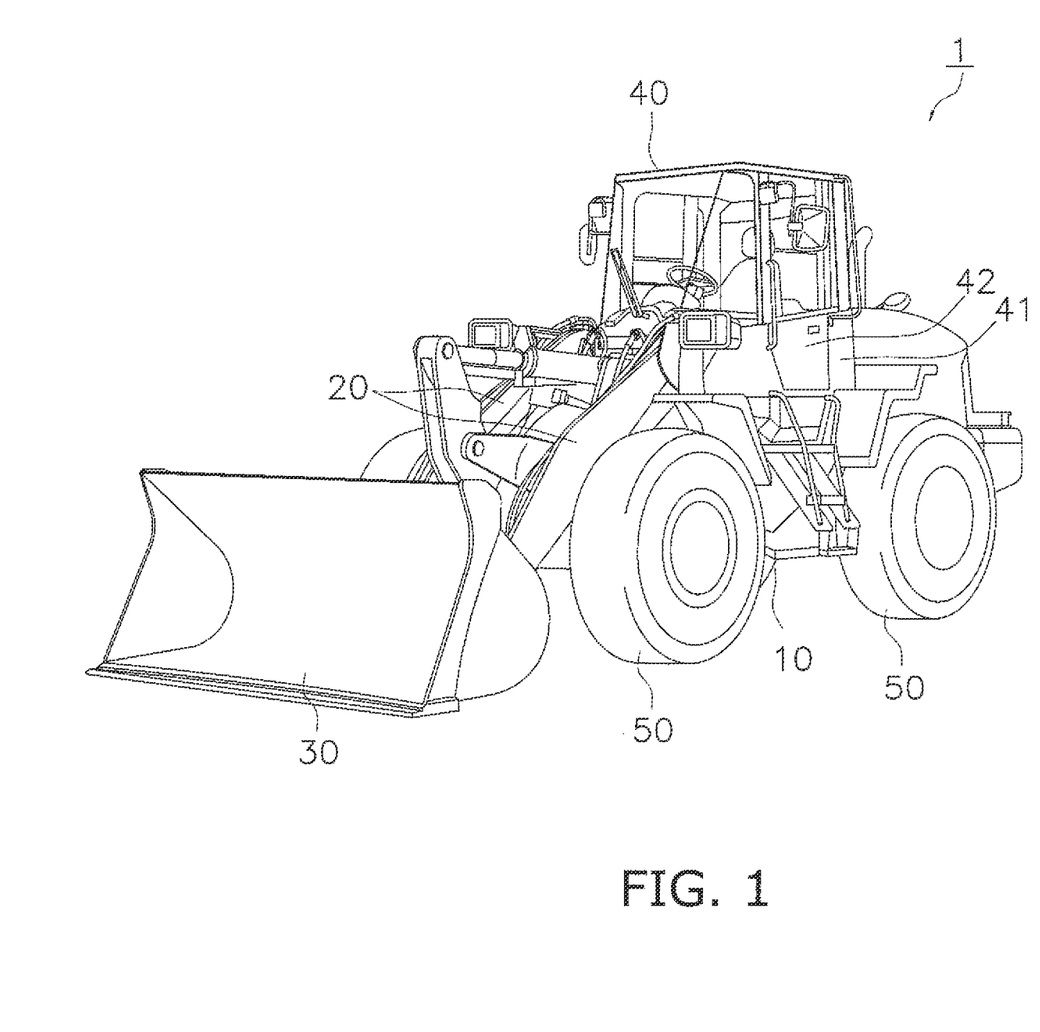
FIG. 1 is a side view of the entire structure of a wheel loader.

A structure of a wheel loader 1 according to an embodiment will be explained with reference to the figures. FIG. 1 is a perspective view of the wheel loader 1 according to the present exemplary embodiment. It should be noted in the following explanation that "up", "down", "left", "right", "front" and "rear" are terms based on an operator seated on an operator seat, The wheel loader 1 includes a frame 10, a pair of booms 20, a bucket 30, a cab 40 and four tires 50.

The frame 10 supports the cab 40. The frame 10 has so-called an articulated structure.

The booms 20 of the pair are disposed while being opposed to each other in a vehicle transverse direction. The booms 20 of the pair are pivotally supported by the front end portion of the frame 10. The bucket 30 is pivotally supported by the front end portions of the booms 20 of the pair.

The cab 40 is disposed on the frame 10. The cab 40 includes a side panel 41 and a door 42. The door 42 is attached to an entrance 41A (see FIG. 3) formed in the side panel 41. The internal structure of the cab 40 will be described below.

The four tires 50 support the frame 10.

Internal Structure of Cab 40

Figure 2:
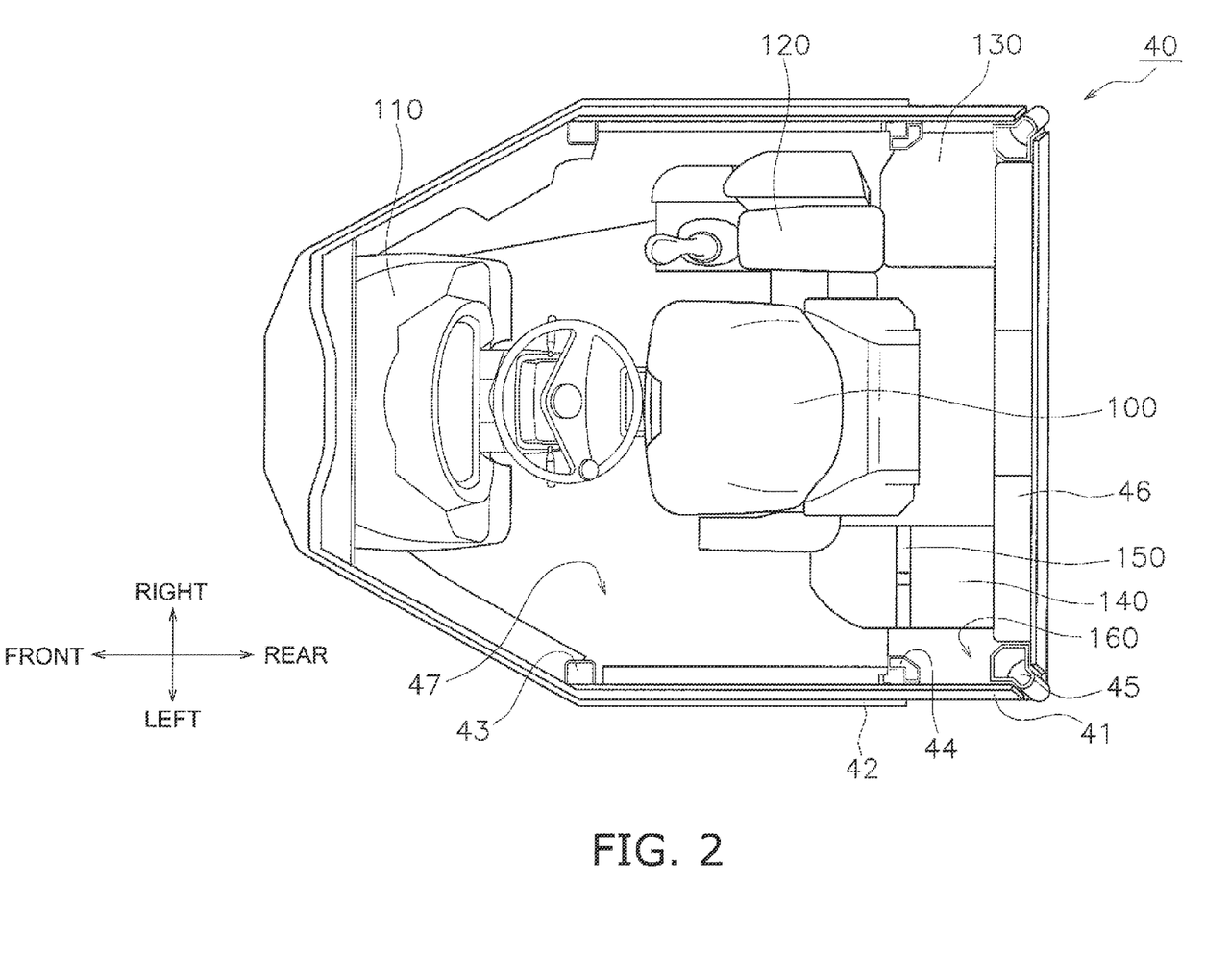
FIG. 2 is a plan view of the internal structure of a cab.
Figure 3:
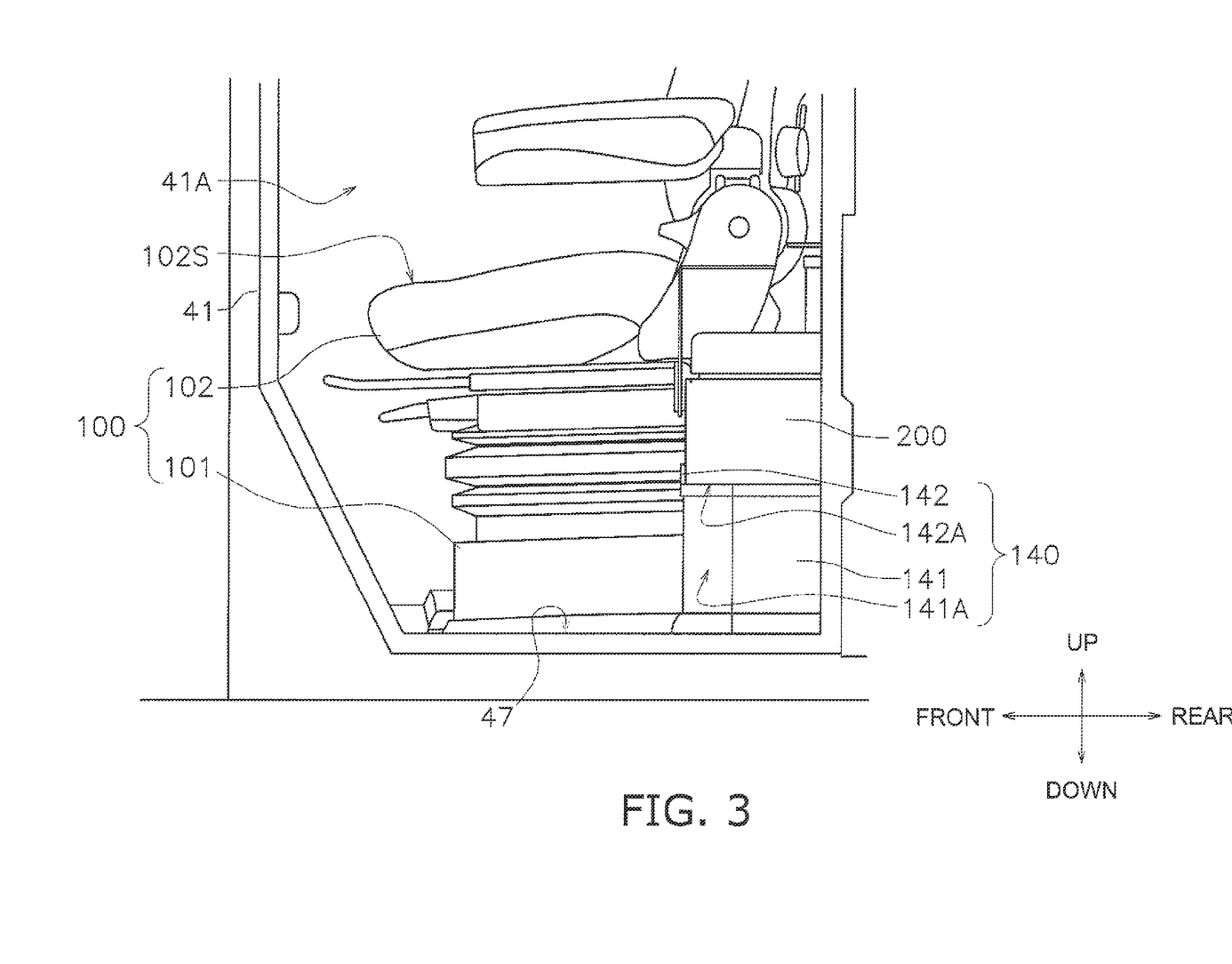
FIG. 3 is a left side view of the internal structure of the cab.

Next, the internal structure of the cab 40 will be explained with reference to the figures. FIG. 2 is a plan view of the internal structure of the cab 40. FIG. 3 is a left side view of the internal structure of the cab 40. It should be noted that FIG. 3 omits illustration of the door 42 and illustrates the entrance 41A formed in the side panel 41. Further, FIG. 2 illustrates a state that a lunch box 200 is removed from a utility base 140, whereas FIG. 3 illustrates a state that the lunch box 200 is placed on the utility base 140.

As illustrated in FIGS. 2 and 3, the cab 40 includes the side panel 41, the door 42, a front pillar 43, a side pillar 44, a rear pillar 45, a rear panel 46 and a floor board 47.

The side panel 41 is disposed along the back-and-forth direction. The entrance 41A is formed in the side panel 41 for allowing an operator to get on and off. The door 42 is attached to the side pillar 44 in an openable/closable state while closing the entrance 41A.

The front pillar 43 is a pillar disposed upright along the front end of the entrance 41A. The side pillar 44 (an exemplary pillar) is a pillar disposed upright along the rear end of the entrance 41A. The side pillar 44 supports the side panel 41 from the inside. The rear pillar 45 is a pillar disposed uptight along the rear end of the side panel 41. The rear pillar 45 supports the side panel 41 and the rear panel 46 from the inside.

The rear panel 46 is coupled to the rear end of the side panel 41 while being disposed along the right-and-left direction. The rear panel 46 accommodates electric cables and etc. The floor board 47 supports respective pillars 43 to 45, the side panel 41 and the rear panel 46.

Further, as illustrated in FIGS. 2 and 3, the wheel loader 1 includes an operator seat 100, a front console 110, a side console 120, a rear stand 130, the utility base 140, a buckle 150 and a magazine box 160 within the cab 40.

The operator seat 100 is a seat for allowing an operator to be seated thereon. The operator seat 100 is disposed on the middle of the floor board 57 while being disposed in front of the rear panel 46. As illustrated in FIG. 3, the operator seat 100 includes a pedestal part 101 and a seat part 102 disposed on the pedestal part 101.

The front console 110 is disposed in front of the operator seat 100. An operating panel, a handle post and etc are attached to the front console 110. The side console 120 is disposed on the right side of the operator seat 100. A work implement lever for operating the bucket 30 and a variety of switches are disposed on the side console 120. The rear stand 130 is disposed behind the side console 120. The rear stand 130 is a rack for placing therein small articles and etc.

The utility base 140 is disposed in front of the rear panel 46 while being disposed between the operator seat 100 and the side panel 41. In other words, the utility base 140 is disposed on the obliquely left rear side of the operator seat 100. The utility base 140 is a base for placing thereon the lunch box 200 and is larger than the rear stand 130.

As illustrated in FIG. 3, the utility base 140 is exposed through the entrance 41A in a left side view of the cab 40. In other words, the front end of the utility base 140 is positioned forwards of the rear end of the entrance 41A. It should be noted that the front end of the utility base 140 is positioned rearwards of the front end of the pedestal part 101. Further, the upper end of the utility base 140 is positioned lower than a seat surface 102S of the seat part 102.

As illustrated in FIG. 3, the utility base 140 herein includes a base main body 141 for disposing thereon the lunch box 200 and a front wall 142. A cut-out portion 141A is formed in the left front corner portion of the base main body 141. The front wall 142 has a stepped portion 142A formed along the cut-out portion 141A in a side view. The front wall 142 holds the lunch box 200 for preventing it from moving forwards, whereas the stepped portion 142A supports the lunch box 200 without interfering with the left front corner portion of the lunch box 200. The detailed structure of the utility base 140 will be described below.

The buckle 150 is attached to the utility base 140. The buckle 150 is a binder for fixing the lunch box 200, the tool box and etc. placed on the utility base 140.

The magazine box 160 is formed on the inner side of the side panel 41. The magazine box 160 is a vertical hole for accommodating therein an operating manual and etc. (see FIG. 4).

Structure of Utility Base 140

Figure 4:
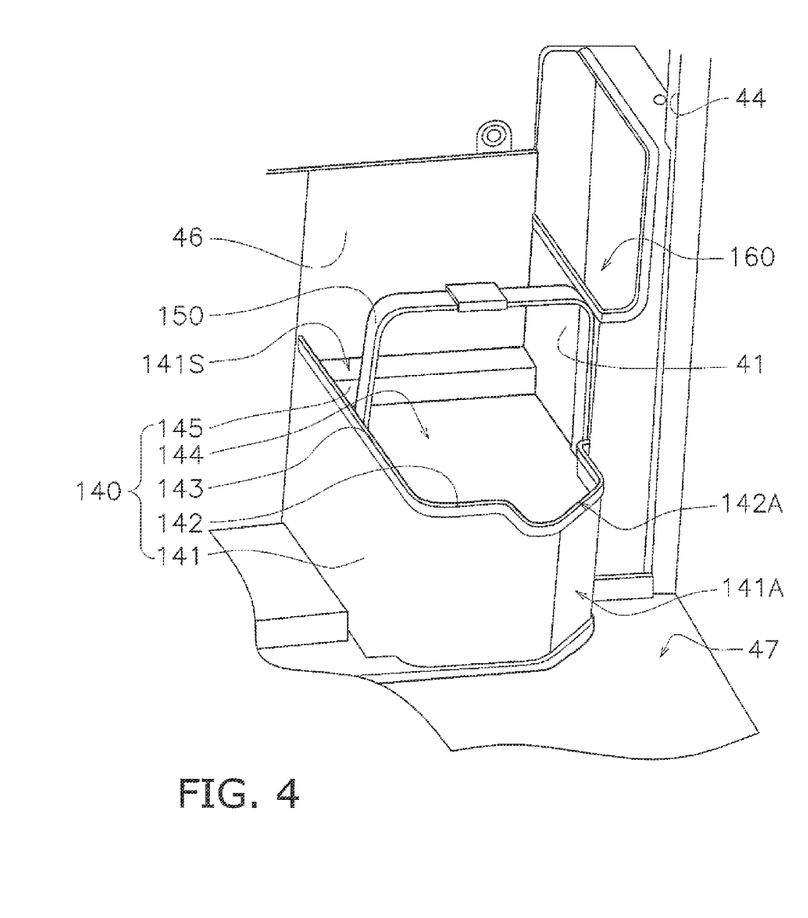
FIG. 4 is a perspective view of the structure of a utility base.
Figure 5:
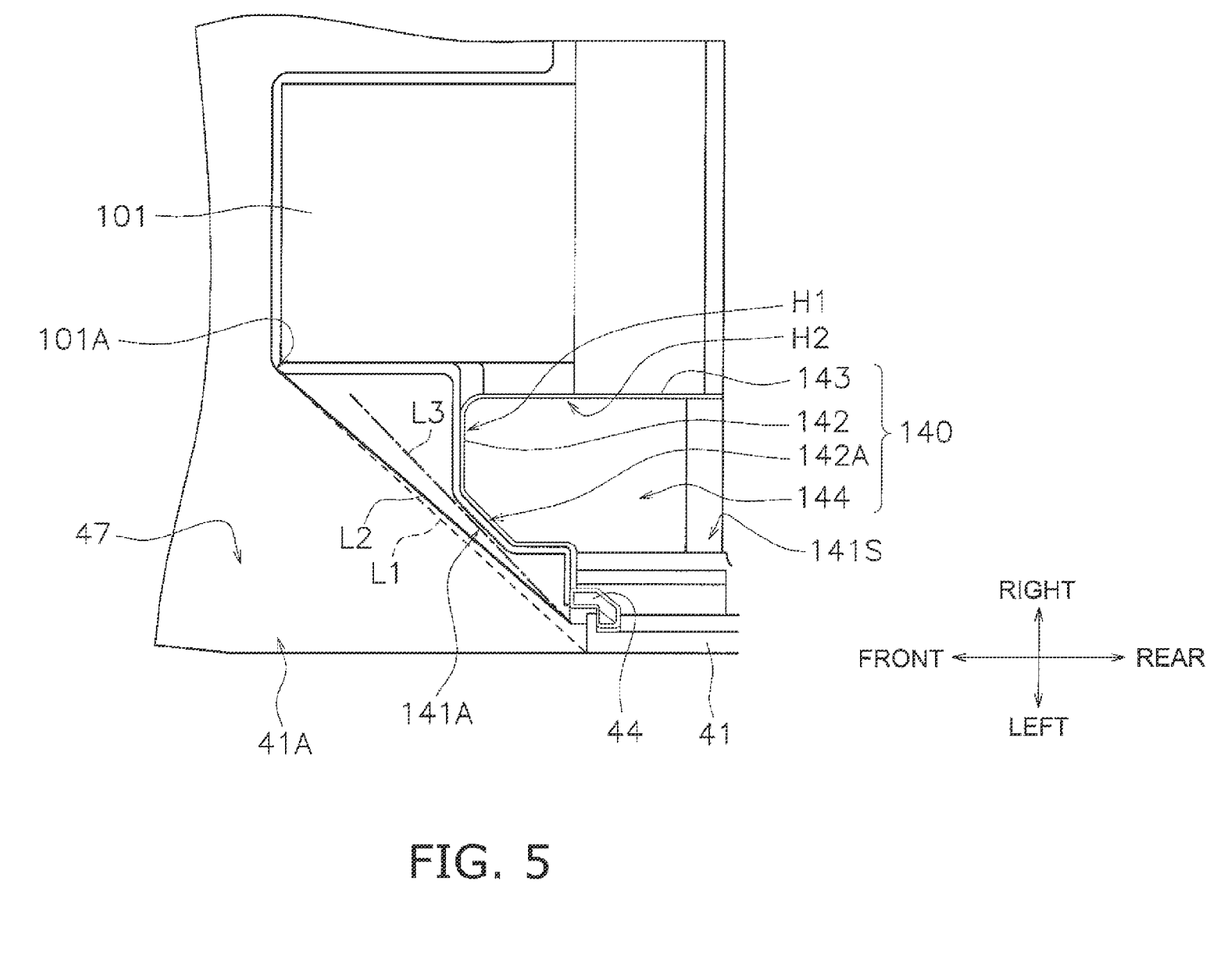
FIG. 5 is a plan view of the structure of the utility base.
Figure 6:
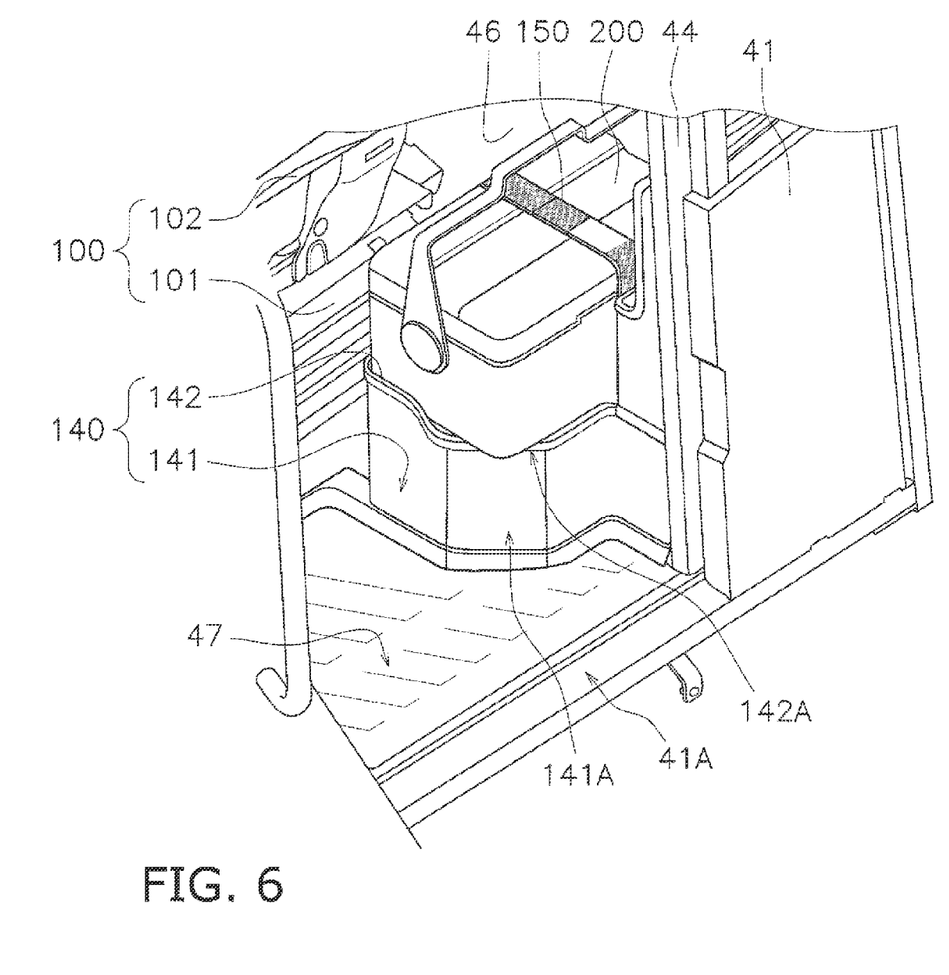
FIG. 6 is a perspective view of the structure of the utility base.

Next, the structure of the utility base 140 will be explained with reference to the figures. FIG. 4 is a perspective view of the structure of the utility base 140. FIG. 5 is a plan view of the structure of the utility base 140. FIG. 6 is a perspective view of the structure of the utility base 140. It should be noted that FIG. 4 illustrates a state that the lunch box 200 is removed from the utility base 140, whereas FIG. 6 illustrates a state that the lunch box 200 is placed on the utility base 140. Further, FIG. 5 illustrates only the pedestal part 101 of the operator seat 100.

As illustrated in FIG. 4, the utility base 140 includes the base main body 141, the front wall 142, a sidewall 143 and an accommodation recess 144.

The base main body 141 has a box shape and is disposed on the floor board 47. As illustrated in FIG. 5, the base main body 141 has a trapezoid-like pentagonal shape in a plan view. In the present embodiment, the base main body 141 is integrally formed with the side panel 41 and the rear panel 46.

The base main body 141 has a placement surface 141S and the cut-out portion 141A. The placement surface 141S is an upper surface for disposing thereon the lunch box 200. The accommodation recess 144 is formed on the placement surface 141S. The cut-out portion 141A is formed in a front side corner, adjacent to the entrance 41A, of the base main body 141. Thus, the front side corner, adjacent to the entrance 41A, of the base main body 141 is obliquely removed, while a front side corner on the operator seat 100 side is left.

It should be noted that the height of the base main body 141 from the floor board 47, i.e., the height of the placement surface 141S is preferably higher than the position through which an operator's toe passes. Specifically, the height of the base main body 141 is preferably greater than or equal to 30 mm, and is more preferably greater than or equal to 50 mm.

As illustrated in FIG. 5, the front wall 142 is formed in the right- and left direction along a front side H1 of the placement surface 141S, and is disposed upright with respect to the placement surface 141S. The front wall 142 has the stepped portion 142A formed along the cut-out portion 141A in a left side view (see FIG. 3). The stepped portion 142A is backwardly formed from the left end of the front wall 142. The stepped portion 142A is positioned at roughly the same height as the placement surface 141S. Therefore, as illustrated in FIG. 6, when the lunch box 200 is placed on the base main body 141, the left front corner portion of the lunch box 200 is supported by the stepped portion 142A while being protruded towards the cut-out portion 141A. In this case, the front wall 142 is positioned in front of the lunch box 200.

As illustrated in FIG. 5, the sidewall 143 is formed in the back-and-forth direction along a lateral side H2 of the placement surface 141S, and is disposed upright with respect to the placement surface 141S. The sidewall 143 is backwardly formed from the right end of the front wall 142. Therefore, as illustrated in FIG. 6, the sidewall 143 is positioned on the right side of the lunch box 200 when the lunch box 200 is placed on the base main body 141.

The accommodation recess 144 is a dent formed on the placement surface 141S. The accommodation recess 144 can accommodate small articles such as a tool. In the present embodiment, the accommodation recess 144 is formed across a large part of the placement surface 141S except for the rear end portion thereof. Therefore, as illustrated in FIG. 4, a support portion 145, firmed correspondingly to the accommodation recess 144, is formed in an elongated shape extended along the rear panel 46. The support portion 145 forms the placement surface 141S, and supports the bottom surface of the lunch box 200 when the lunch box 200 is placed on the base main body 141 as illustrated in FIG. 6. It should be noted that the accommodation recess 144 may be formed only on a part of the placement surface 141S, while the shape of the accommodation recess 144 and that of the support portion 145 can be arbitrarily set.

As illustrated in FIG. 5, the utility base 140 is herein disposed on a cab rear side of a first straight line L1 (a dashed line) connecting a front side corner portion 101A of the pedestal part 101 and the rear end of the entrance 41A in a plan view.

Further, as illustrated in FIG. 5, the utility base 140 is disposed on a cab rear side of a second straight line L2 (a solid line) connecting the front side corner portion 101A of the pedestal part 101 and the front end of the side pillar 44 in a plan view.

Moreover, as illustrated in FIG. 5, the utility base 140 is disposed on a cab rear side of a third straight line L3 (a dashed dotted line) slanted about the front end of the side pillar 44 at an angle of 45 degrees with respect to the back-and-forth direction in a plan view.

The first straight line L1, the second straight line L2 and the third straight line L3 respectively indicate limit lines through which an operator's toe passes in getting on or off through the entrance 41A. In other words, the toe of an operator normally moves a region arranged forwards of the limit lines depicted in FIG. 5 either when the operator is seated on the operator seat 100 or when the operator gets out of the entrance 41A. The utility base 140 is disposed rearwards of the region through which the operator's toe passes.

(1) In the utility base 140 according to the exemplary embodiment, the base main body 141 has the cut-out portion 141A formed in the front side corner thereof in a plan view of the placement surface 141S. The front wall 142 has the stepped portion 142A formed along the cut-out portion 141A in a plan view of the placement surface 141S.

Thus, the front side corner of the utility base 140 is cut out. Therefore, a space for allowing the operator's toe to move can be reliably produced even when the utility base 140 is disposed while being exposed through the entrance 41A. Therefore, operator's getting-on/off performance can be enhanced.

Further, the stepped portion 142A is formed along the cut-out portion 141A of the utility base 140. Therefore, a lunch box, having a roughly equivalent size to that of a conventional one, can be placed by making the corner portion of the lunch box 200 protrude from the stepped portion 142A, even when an installation space thereof is reduced due to the cut-out portion 141A.

(2) The base main body 141 has the accommodation recess 144 formed on the placement surface 141S.

Therefore, small articles can be accommodated under the lunch box 200 placed on the placement surface 141S. Convenience of the utility base 140 can be thereby enhanced.

(3) As illustrated in FIG. 5, the utility base 140 is disposed on the cab rear side of the first straight line L1 connecting the front side corner portion 101A of the pedestal part 101 and the rear end of the entrance 41A.

Further, as illustrated in FIG. 5, the utility base 140 is disposed on the cab rear side of the second straight line L2 connecting the front side corner portion 101A of the pedestal part 101 and the front end of the side pillar 44.

Yet further, as illustrated in FIG. 5, the utility base 140 is disposed on the cab rear side of the third straight line L3 (the dashed dotted line) slanted about the front end of the side pillar 44 at an angle of 45 degrees with respect to the back-and-forth direction.

Thus, the utility base 140 is positioned rearwards of the first straight line L1, the second straight line L2 and the third straight line L3 in a plan view. Therefore, the utility base 140 can be inhibited from being protruded to the region in which an operator moves one's toe. Operator's getting-on/off performance can be thereby further enhanced.

(4) The upper end of the utility base 140 is positioned lower than the seat surface 102S of the seat part 102.

Therefore, the lunch box 200 can be inhibited from making contact with an operator's arm or etc. when the lunch box 200 is placed on the utility base 140.

(5) In the utility base 140, the height of the base main body 141 is greater than or equal to 30 mm.

Therefore, the lunch box 200 can be disposed in a position higher than the position through which the operator's toe passes. Operator's getting-on/off performance can be thereby further enhanced.

OTHER EXEMPLARY EMBODIMENTS

An exemplary embodiment of the present invention has been explained above. However, the present invention is not limited to the aforementioned exemplary embodiment, and a variety of changes can be made without departing from the scope of the present invention.

(A) In the aforementioned embodiment, the entrance 41A is positioned on the left side of the operator seat 100, but may be positioned on the right side of the operator seat 100. In this case, the utility base 140 is only required to be disposed on the right side of the operator seat 100.

(B) In the aforementioned embodiment, the utility base 140 is integrally formed with the side panel 41 and the rear panel 46, but may be separately formed from them.

(C) In the aforementioned embodiment, the utility base 140 has the accommodation recess 144 formed on the placement surface 141S, but may not include the accommodation recess 144.

(D) In the aforementioned embodiment, the case has been explained that the utility base 140 is applied to the wheel loader 1. However, the present invention is not limited to this. The utility base 140 can be applied to a work vehicle equipped with a cab (e.g., a bulldozer, an excavator, etc.).

(E) In the aforementioned embodiment, the lunch box 200 is placed on the utility base 140. However, the present invention is not limited to this. A variety of objects such as a tool box and a document can be placed on the utility base 140.

Figure 7:
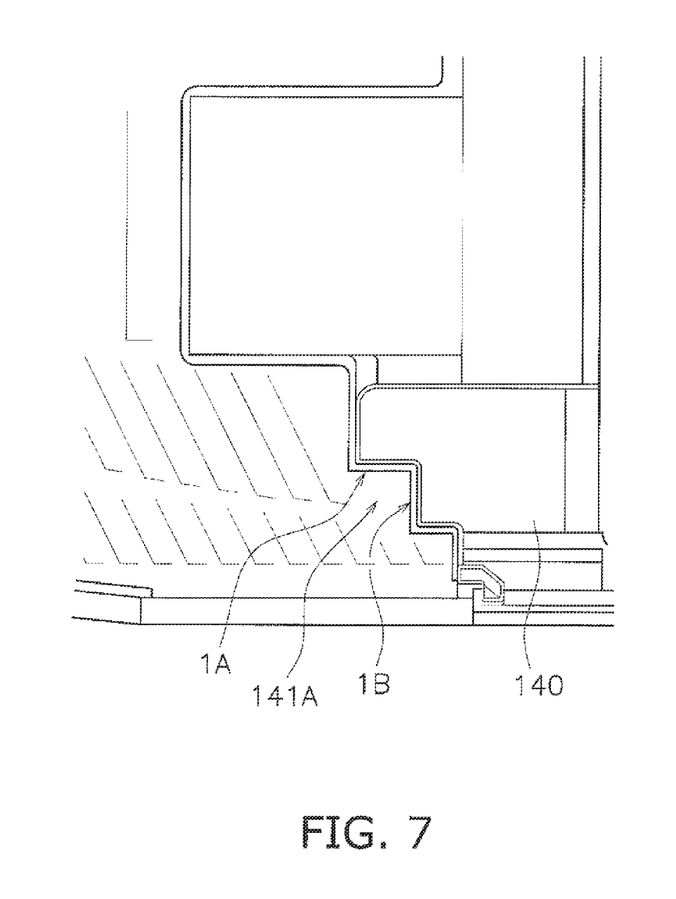
FIG. 7 is a plan view of the structure of the utility base.
Figure 8:
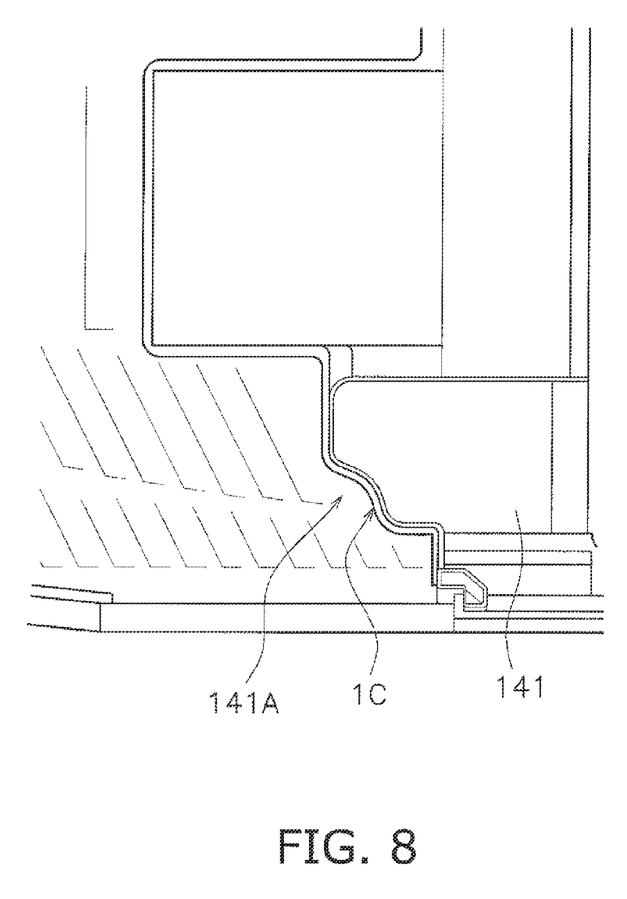
FIG. 8 is a plan view of the structure of the utility base.

(F) In the aforementioned embodiment, the cut-out portion 141A forms a single surface on the base main body 141. However, the present invention is not limited to this. For example, the cut-out portion 141A may form two surfaces 1A and 1B as illustrated in FIG. 7, or alternatively, may form a single curved surface IC as illustrated in FIG. 8.

(G) In the aforementioned embodiment, the lunch box 200 is placed on the utility base 140. However, the present invention is not limited to this. A variety of installation objects such as a tool, a document and etc. can be placed on the utility base 140.

(H) In the aforementioned embodiment, the buckle 150 is attached to the utility base 140. However, the buckle 150 may not be attached thereto.

The cab for a work vehicle according to the embodiments can enhance operator's getting-on/off performance even when a utility base is disposed therein, and is therefore useful in the field of work vehicles.

The invention claimed is:

1. A cab for a work vehicle comprising:
a side panel in which an entrance is formed;
an operator seat including a pedestal part and a seat part disposed on the pedestal part;
a rear panel disposed behind the operator seat; and
a utility base disposed in front of the rear panel and between the operator seat and the side panel, the utility base being exposed through the entrance in a side view of the side panel,
the utility base including a base main body and a front wall, the base main body having a placement surface, the front wall being formed along a front side of the placement surface,
the base main body having a cut-out portion formed in a front side corner adjacent to the entrance in a plan view of the placement surface, and
the front wall having a stepped portion formed along the cut-out portion in a side view of the base main body and a height of the front wall being partially lowered at the stepped portion.

2. The cab for a work vehicle according to claim 1, wherein the utility base is disposed rearwards of a first straight line connecting a front side corner portion of the pedestal part and a rear end of the entrance in a plan view.

3. The cab for a work vehicle according to claim 1, further comprising
a pillar disposed upright along a rear end of the entrance, wherein
the utility base is disposed rearwards of a second straight line connecting a front side corner portion of the pedestal part and the pillar in a plan view.

4. The cab for a work vehicle according to claim 1, further comprising
a pillar disposed upright along a rear end of the entrance, wherein
the utility base is disposed rearwards of a third straight line slanted about the pillar at an angle of 45 degrees with respect to a back-and-forth direction in a plan view.

5. The cab for a work vehicle according to claim 1, wherein the base main body includes an accommodation recess formed on the placement surface.

6. The cab for a work vehicle according to claim 1, wherein an upper end of the utility base is positioned lower than a seat surface of the seat part.

7. The cab for a work vehicle according to claim 1, further comprising
a floor board on which the operator seat is disposed, wherein
a height of the base main body is equal to or higher than 30 mm from the floor board.

* * * * *